Feb. 26, 1935.　　　M. F. CRANEY　　　1,992,815

METHOD OF REPAIRING TORQUE TUBES

Filed March 2, 1933

INVENTOR.
MAURICE F. CRANEY
BY
ATTORNEYS.

Patented Feb. 26, 1935

1,992,815

UNITED STATES PATENT OFFICE 1,992,815

METHOD OF REPAIRING TORQUE TUBES

Maurice F. Craney, Eau Claire, Wis.

Application March 2, 1933, Serial No. 659,304

2 Claims. (Cl. 29—152)

This invention relates to an improved method of repairing torque tubes such as are commonly used in connection with automobiles to house the usual drive shafts thereof, whereby when a certain portion of such a tube becomes worn, the tube may be readily and quickly conditioned for use again.

The forward end of the torque tube of an automobile chassis is usually connected to the transmission of the vehicle or to the engine block by a universal joint, so as to allow freedom of movement of the rear portion of the tube and the rear axle as a result of uneven spots and bumps in the ground surface. Provision is also made for allowing a limited axial movement of the torque tube relatively to the universal joint, which is necessary because of the spring suspension of the body upon the rear axle. To allow such axial movement of the torque tube, the forward end portion thereof is usually slidably supported in a sleeve provided upon the rear portion of a spherical element forming a portion of the universal joint which supports the forward end of the tube, and which commonly is known as the bell.

When the vehicle is traveling over a highway, and particularly if the surface of the highway is rough, the forward end of the torque tube is constantly moving within the sleeve of the bell whereby it, in time, becomes worn to the extent that the connection between the torque tube and the universal joint becomes noisy. The lubricant in the universal joint may also leak therefrom through the gap resulting between the sleeve and the worn part of the torque tube supported therein. To properly repair the worn parts of the torque tube and the universal joint, these parts must be replaced which at present involves considerable expense as it necessitates disassembling the entire rear axle of the vehicle, for the reason that the entire tube must usually be replaced. In some instances, the worn sleeve of the bell is split and a suitable clamp secured thereto for contracting the sleeve sufficiently to firmly grip the extension of the torque tube. To thus split the sleeve of the bell is unsatisfactory as it establishes communication between the interior of the universal joint and the atmosphere, whereby the lubricant within the universal joint may escape therefrom. It is therefore desirable that means be provided whereby the forward end of the torque tube may be repaired in such a manner as to restore the torque tube to its normal condition without having to disassemble the entire rear axle, and also whereby the worn torque tube when repaired, will be substantially as good as new.

It is therefore an object of this invention to provide an improved method of repairing worn torque tubes which consists in cutting off the worn end of the tube and attaching thereto a new end portion which has a cylindrical extension adapted to replace the worn part of the tube, and is adapted to be inserted into the sleeve of the bell to thereby provide a normal working fit between said parts, and whereby the rear portion of said tube is permitted freedom of movement in the usual manner, and also whereby the joint between the extension on said new end portion and the sleeve of the bell will be such as to positively prevent leakage of oil from the universal joint or the tube.

A further object of the invention is to provide means whereby when the forward end portion of a torque tube becomes worn, it may be quickly repaired without the necessity of disassembling the rear axle.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 1:
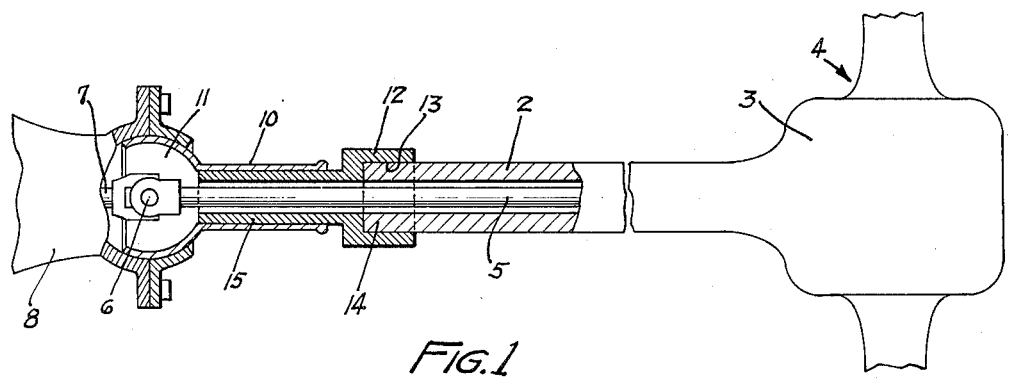
Figure 1 is a detail sectional view showing a torque tube with the invention applied thereto.

In the selected embodiment of the invention here shown, there is illustrated in Figure 1, a torque tube 2, the rear portion of which is shown directly connected to the usual differential housing 3 forming a part of the rear axle assembly, indicated generally by the numeral 4. The usual drive shaft 5 is shown within the torque tube and has a universal joint 6 connecting it with the usual transmission shaft 7 mounted within a transmission housing 8.

Because of the transmission usually being supported upon the side frame members of the chassis, the rear portion of the torque tube moves relatively thereto as a result of the actions of the vehicle springs which connect the rear axle housing 4 to the side frame members of the chassis. The up-and-down movement of the rear axle also imparts a limited axial movement to the torque tube with respect to the transmission housing.

Figure 4:
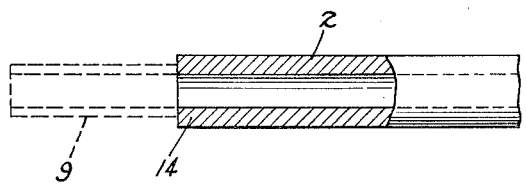
Figure 4 is a view showing a conventional torque tube with the worn part removed, said part being shown in broken lines.

In Figure 4, there is shown a torque tube of ordinary construction with its forward portion 9, which becomes worn, removed therefrom, said portion being indicated in broken lines. This worn portion 9 is supported in the usual rearwardly extending sleeve 10 of the spherical portion 11 of the universal joint which supports the forward end of the torque tube and is commonly known as the bell. The cylindrical portion 9 of the torque tube is snugly received within the sleeve 10 of the bell, whereby it may relatively rotate and axially move therein to compensate for the movement of the rear axle as a result of the vehicle wheels passing over rough places in the road surface. Such relative movement of the cylindrical portion 9 within the sleeve 10 causes the periphery of the portion 9 and the bore of the sleeve 10 to become worn to the extent that play often develops between these parts whereby a chattering noise is developed, which is objectionable. When the parts become thus worn, the lubricant within the bell or universal joint also tends to leak out as will readily be understood.

Figure 2:
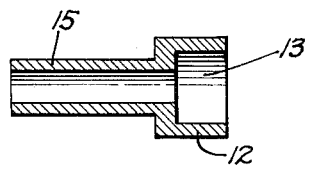
Figure 2 is a longitudinally sectional view of the adaptor removed from the torque tube.
Figure 3:
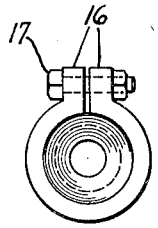
Figure 3 is an end view of a slightly modified form of adaptor removed from the torque tube.

The novel device herein disclosed is clearly illustrated in Figures 1 and 2, and comprises an enlarged portion 12 having a bore 13 adapted to be fitted over the end portion 14 of the torque tube, as shown in Figure 1, subsequent to the removal of the worn portion 9 from the torque tube. This part may readily be removed by means of a hack saw. The bore 13 of the device is of such diameter as to snugly fit the periphery of the portion 14 of the torque tube, it being understood that the periphery of the portion 14 is substantially true in diameter and size.

The device is provided at its forward end with a cylindrical extension 15 which is snugly received in the sleeve 10 of the bell, it being understood that when the torque tube is repaired by attaching the adaptor thereto, a new or unworn bell 11 and sleeve 10 is also substituted for the one that has become worn. It will thus be seen that by cutting off the reduced cylindrical end portion 9 of the torque tube, when it has become worn, and attaching the device to the end of the torque tube, as shown in Figure 1, and also by substituting a new bell for the worn one, the connection between the torque tube and the universal joint is restored to its normal condition and will be equally as good as when new.

If desired, the enlarged hub 12 of the device may be split on one side and provided with a pair of ears 16 apertured to receive a clamping bolt 17, whereby the device may be securely clamped to the forward end portion 14 of the torque tube in the position shown in Figure 1.

The novel device herein disclosed has been found very practical in use and provides means whereby a worn torque tube may be repaired and reconditioned in a comparatively short time without disassembling the rear axle and without replacing the entire tube. A worn torque tube repaired as set forth in this application will render long service, and will be substantially as good as when new. In the description of the invention, I have referred to it as being used in connection with an ordinary torque tube to recondition the same for use, after it has become excessively worn. It is to be understood, however, that if desirable, the torque tube may originally be furnished with a detachable end piece, so that when the cylindrical portion fitting into the sleeve 10 of the bell becomes worn, it may readily be removed from the tube and a new part substituted therefor, together with a new bell and sleeve.

I claim as my invention:

1. The method of renewing the connection between the end portion of a one-piece torque tube and the socketed portion of a universal joint which has become worn, which consists in completely severing the worn end portion only from the torque tube and substituting therefor a new end portion having a socketed portion to receive the end of the torque tube and a reduced portion to engage in the socketed portion of the universal joint to provide a normal working fit between said parts.

2. The method of renewing the connection between the end portion of a one-piece torque tube and the socketed portion of a universal joint which has become worn, which consists in completely severing the worn end portion only from the torque tube, detachably connecting a new end portion of original standard dimensions to said torque tube, and renewing the socketed portion of said universal joint to provide a normal working fit between said parts.

MAURICE F. CRANEY.